March 13, 1934.  W. A. WILHELM  1,950,426
FEEDING APPARATUS FOR EXTRUDING PRESSES
Filed Aug. 11, 1930  11 Sheets-Sheet 1

WITNESSES

INVENTOR
W. A. Wilhelm
BY
ATTORNEY

March 13, 1934.  W. A. WILHELM  1,950,426
FEEDING APPARATUS FOR EXTRUDING PRESSES
Filed Aug. 11, 1930  11 Sheets-Sheet 2
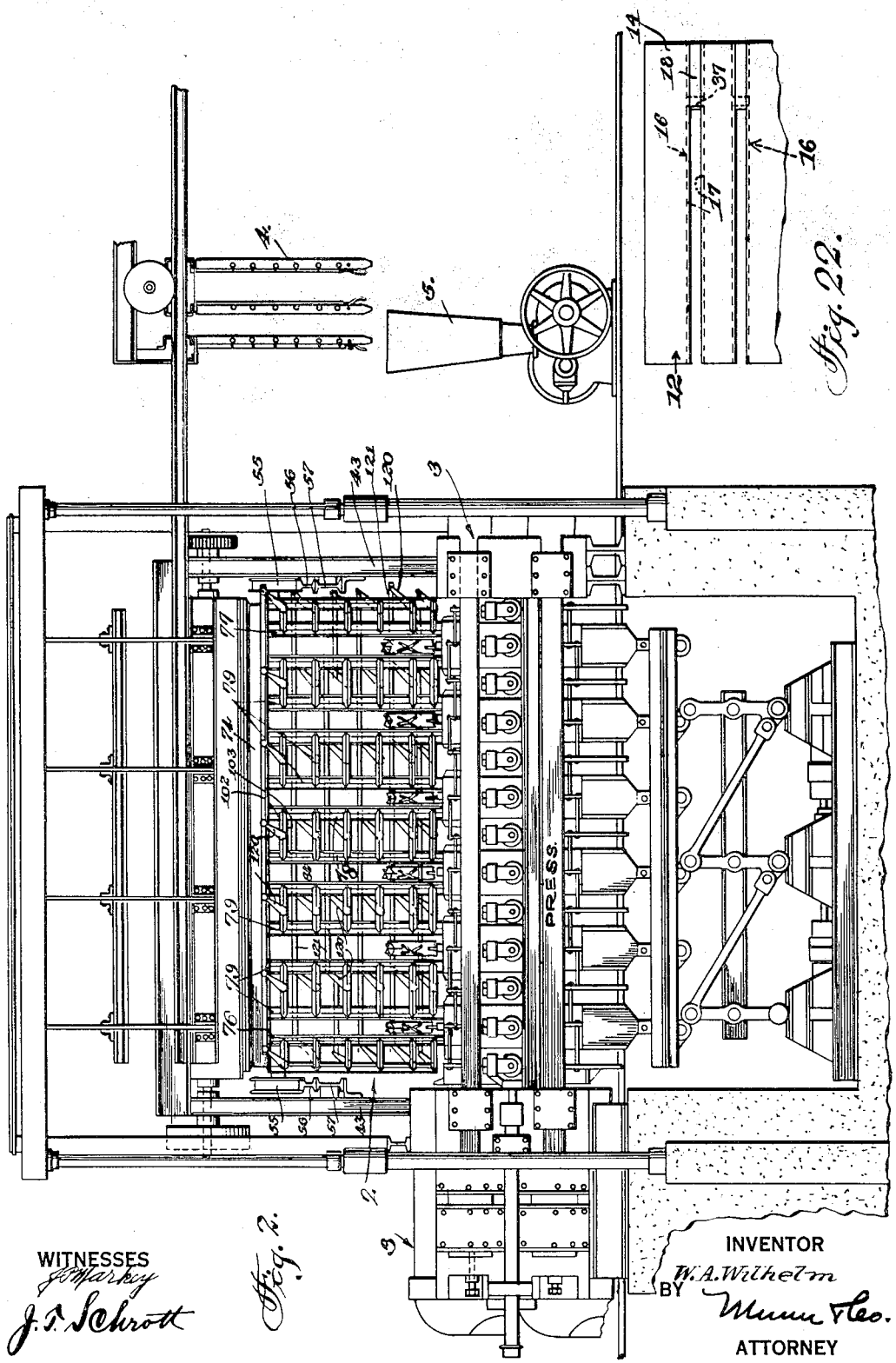
WITNESSES
INVENTOR
W. A. Wilhelm
BY
ATTORNEY

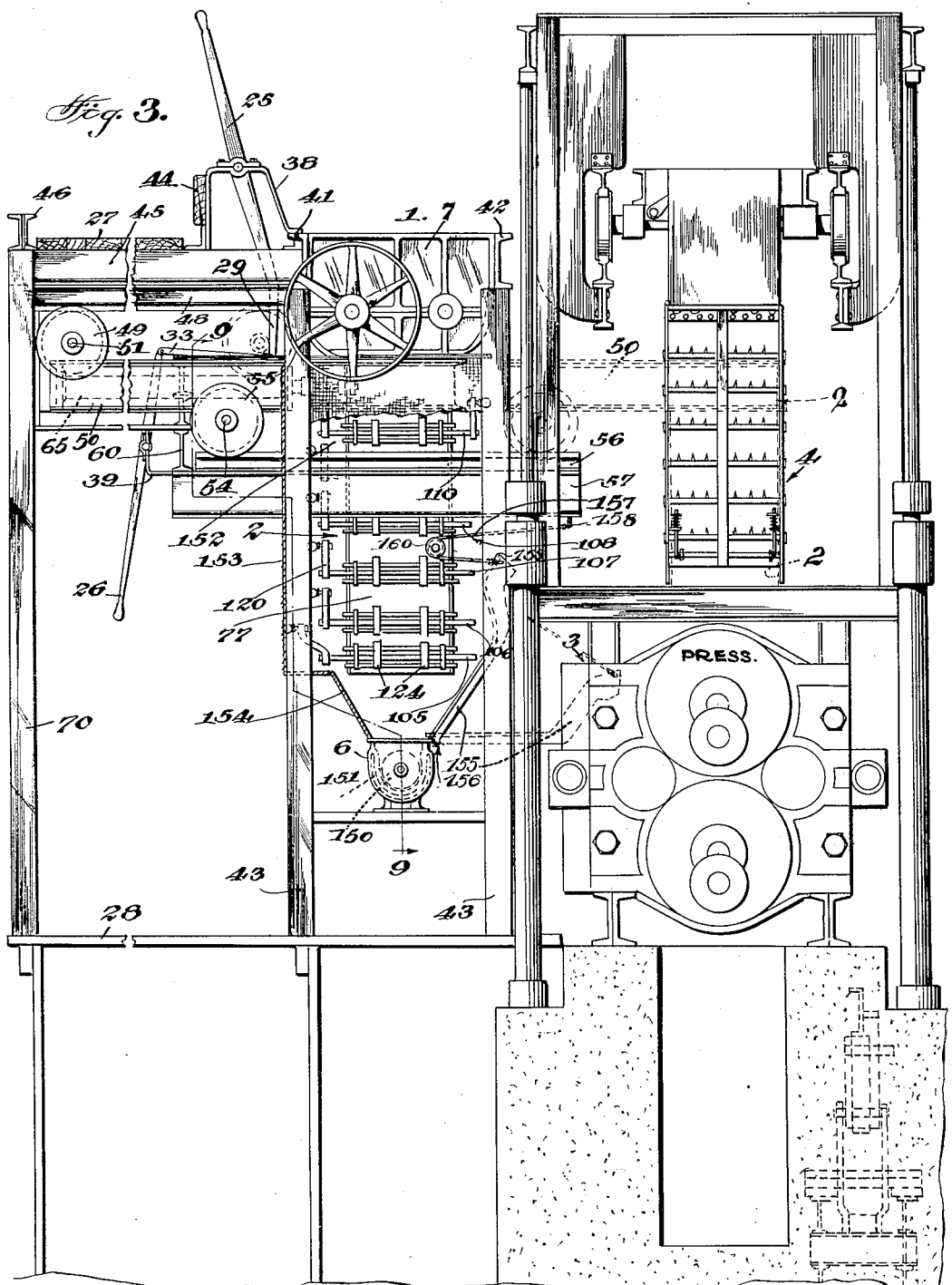

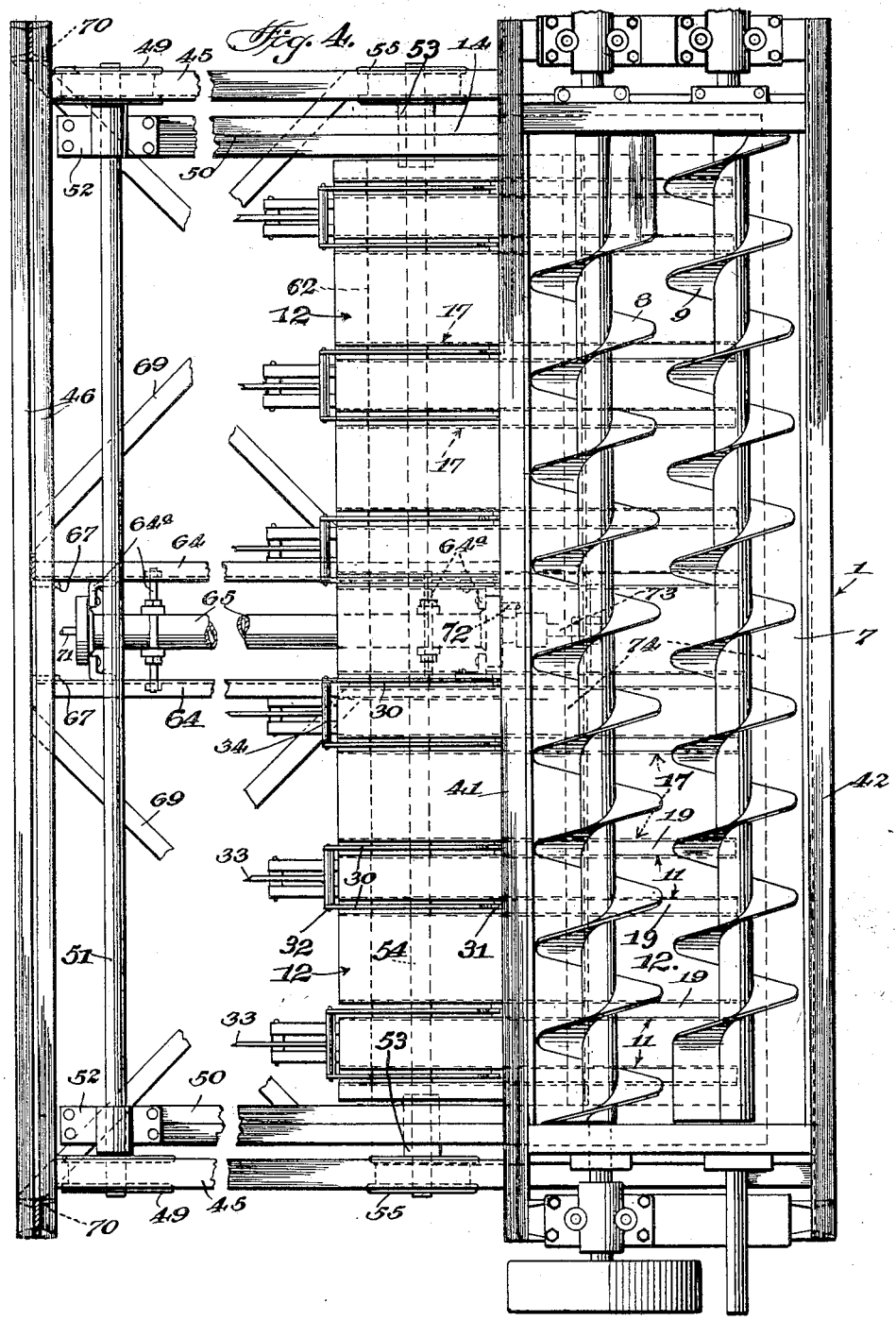

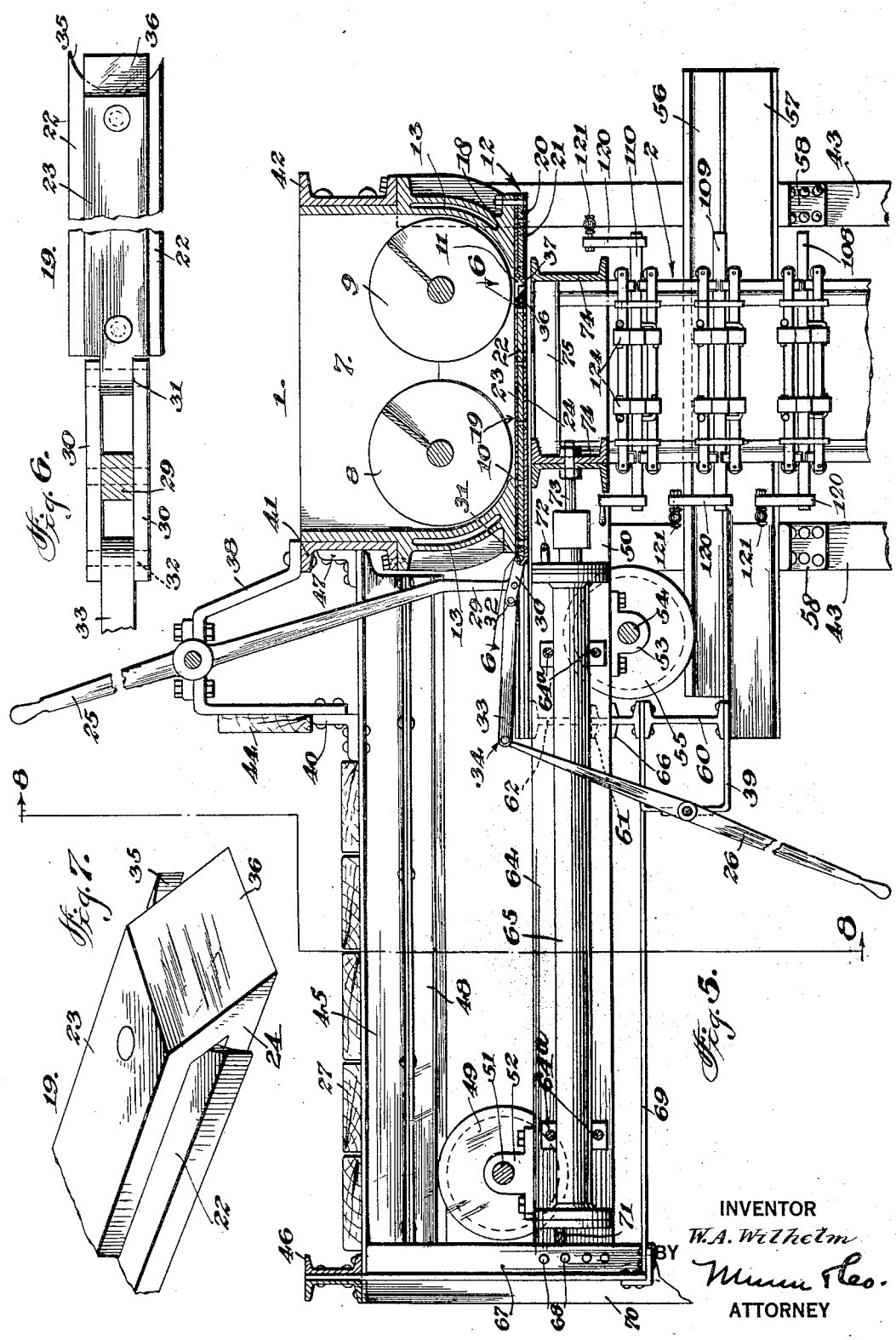

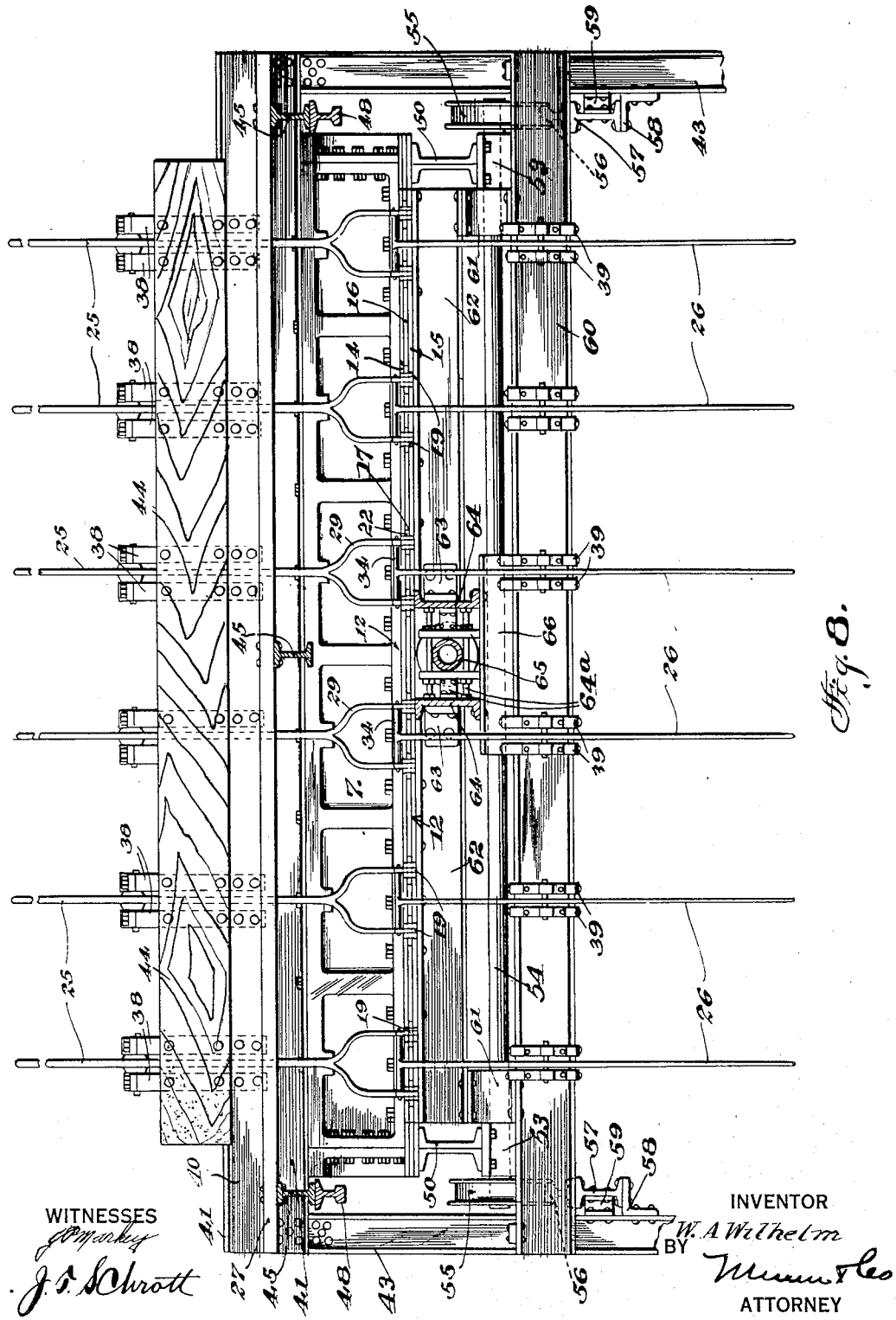

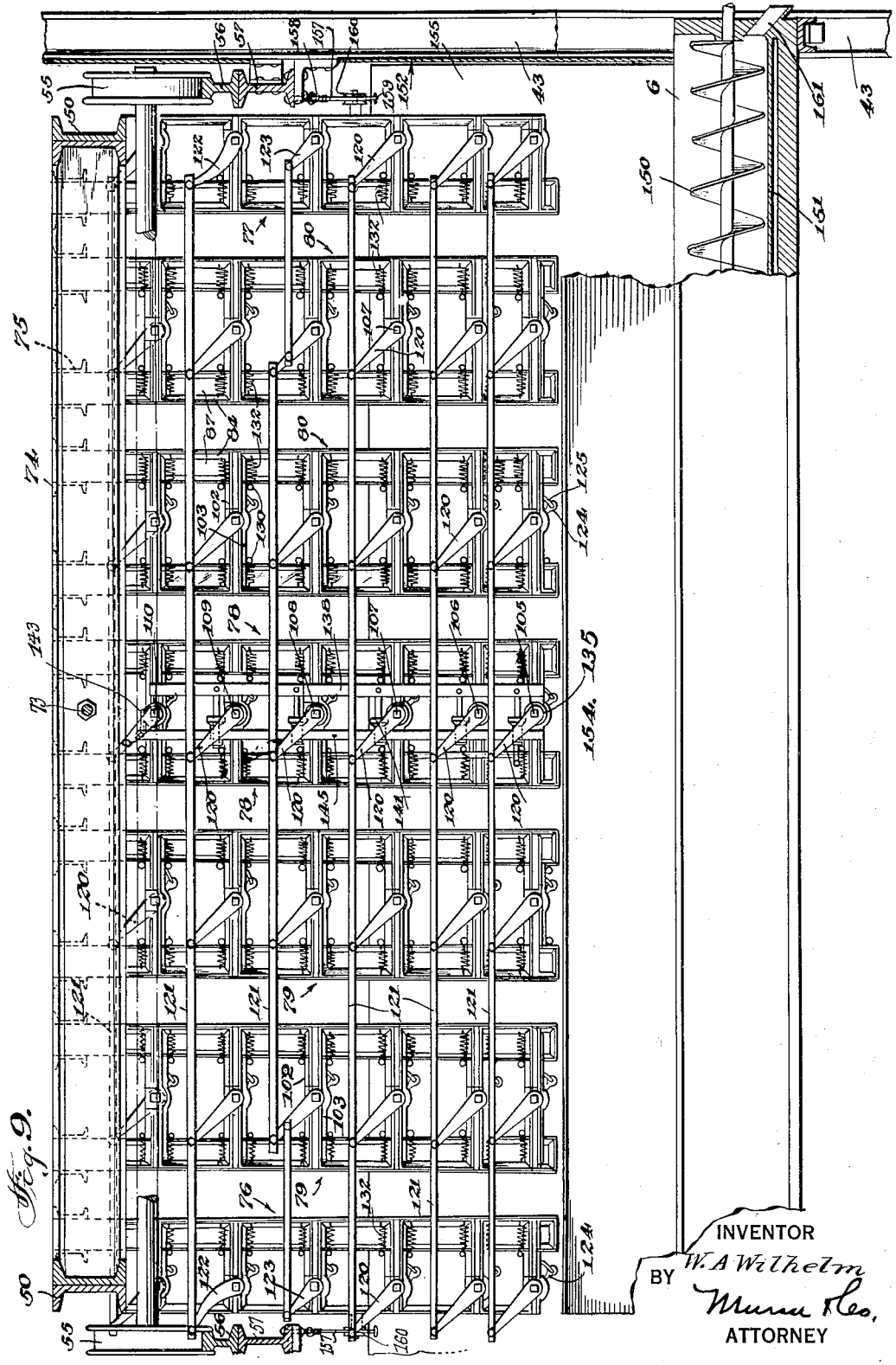

March 13, 1934.  W. A. WILHELM  1,950,426
FEEDING APPARATUS FOR EXTRUDING PRESSES
Filed Aug. 11, 1930  11 Sheets-Sheet 8
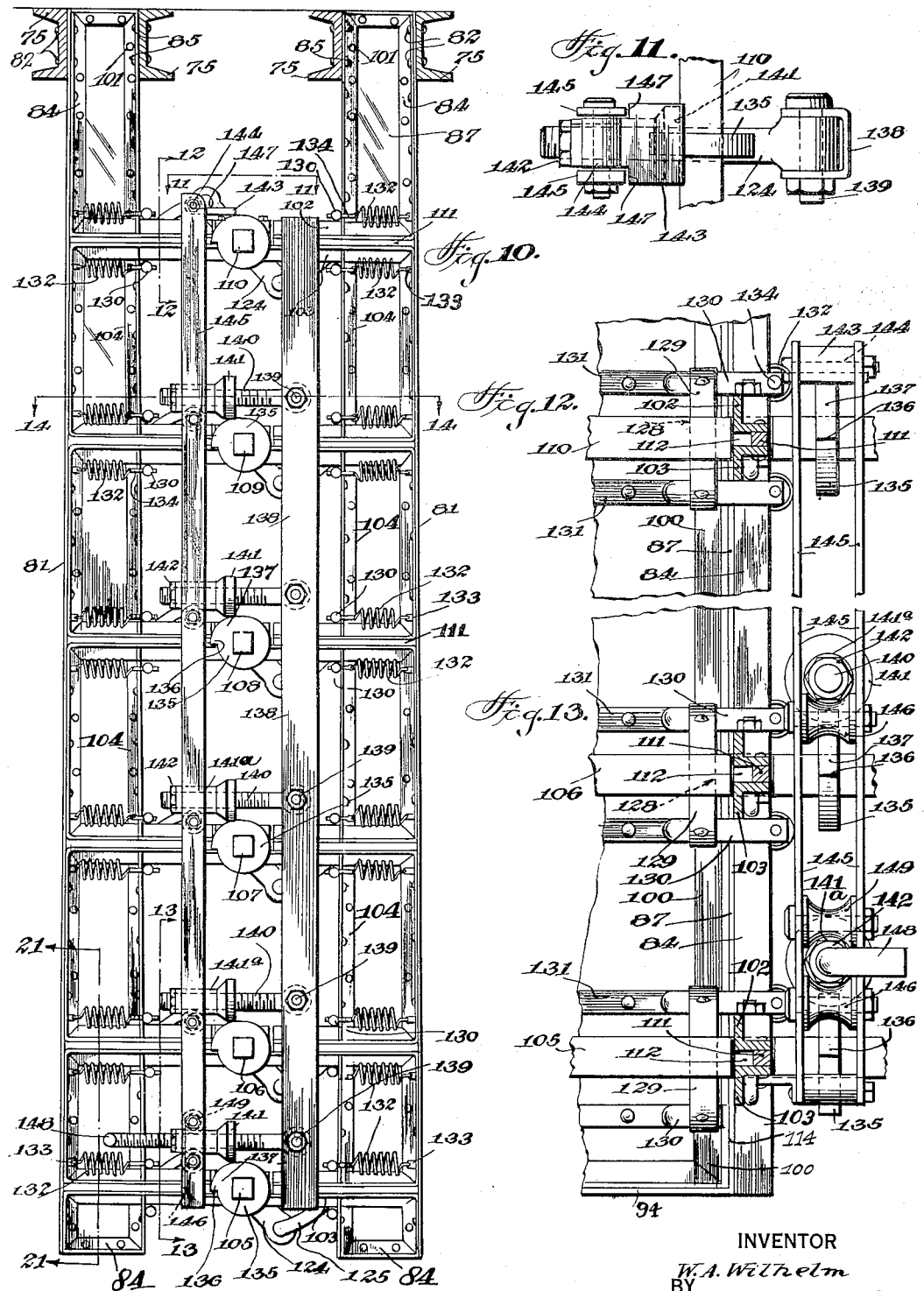
INVENTOR
W. A. Wilhelm
BY
ATTORNEY

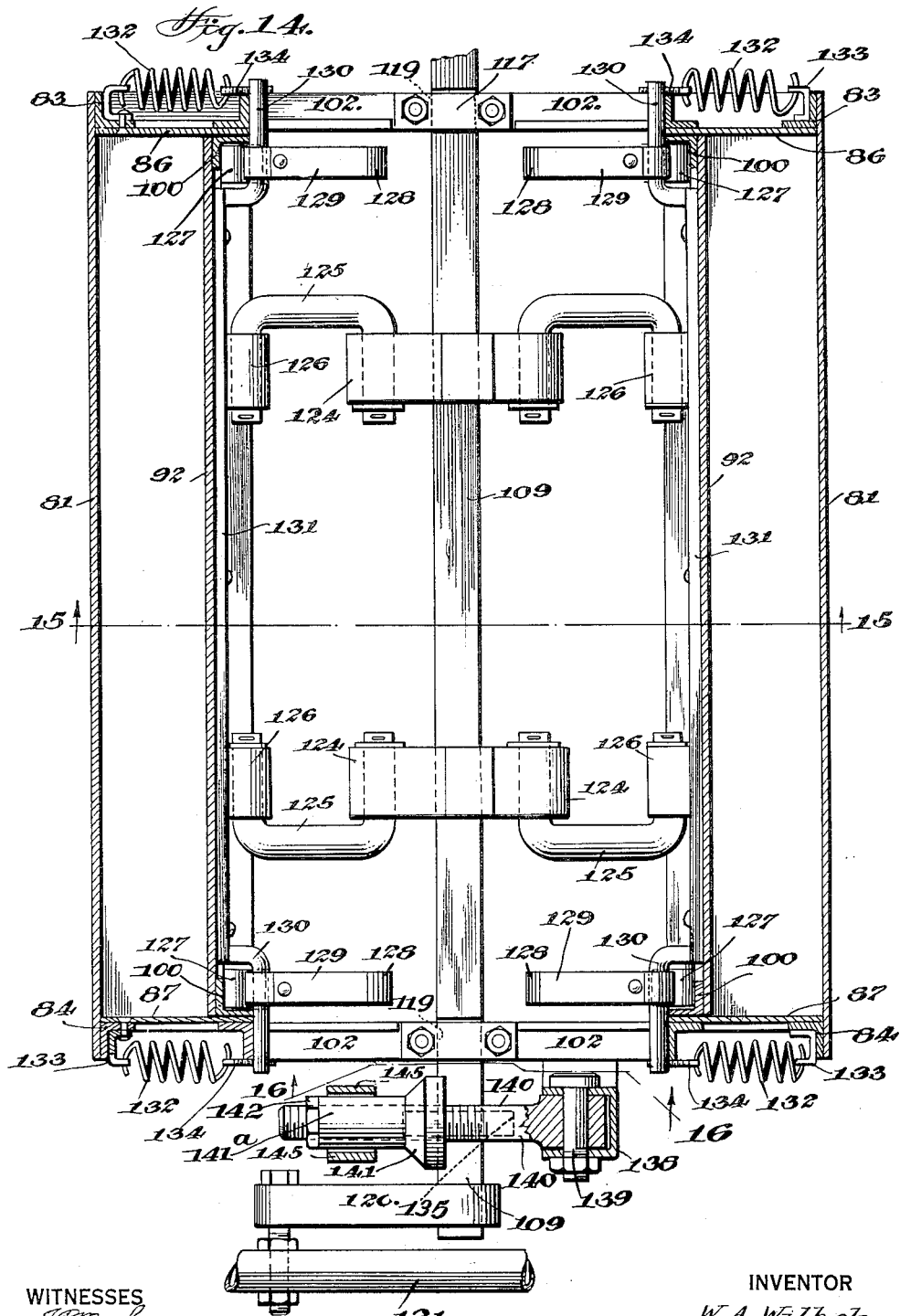

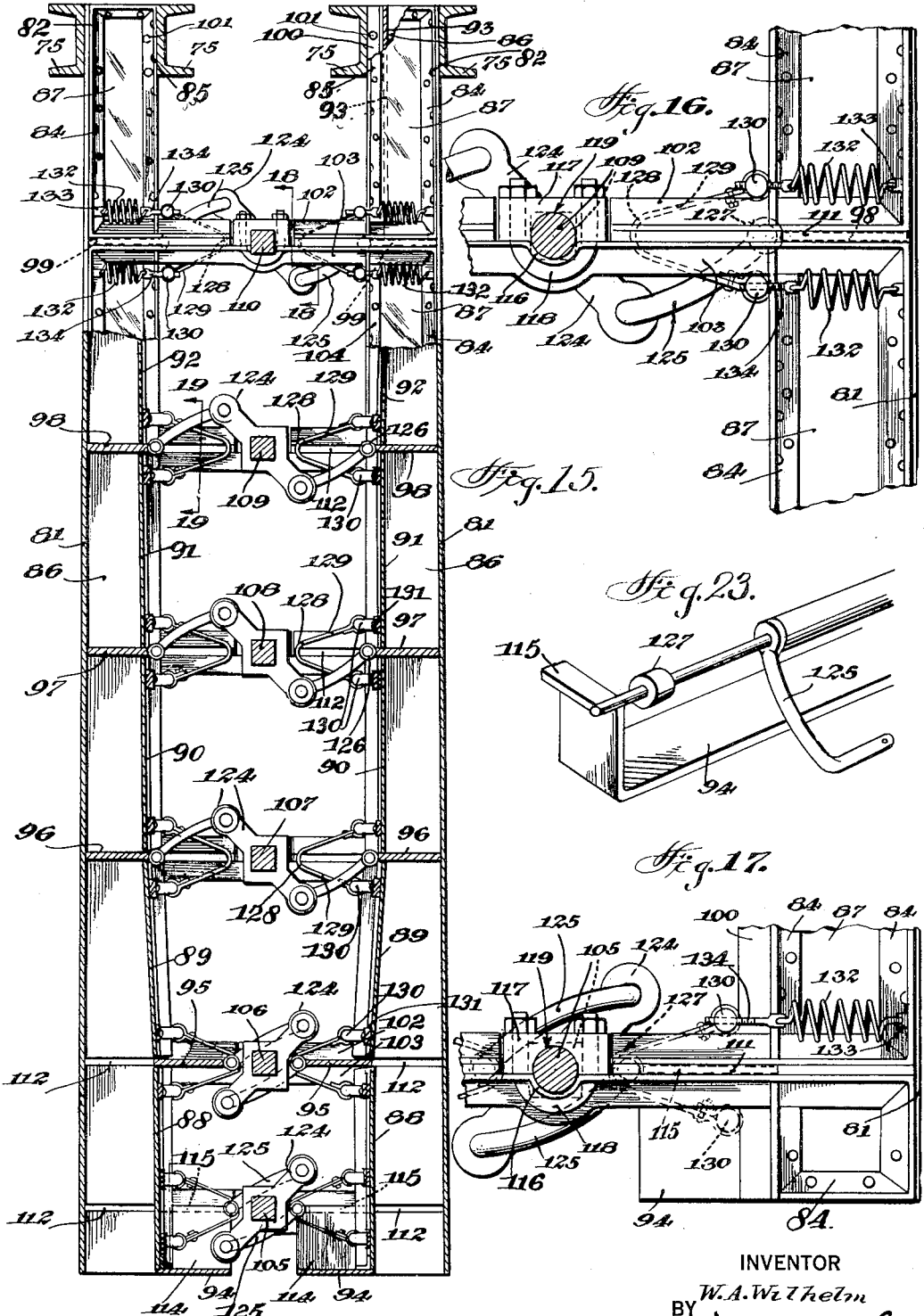

March 13, 1934. W. A. WILHELM 1,950,426
FEEDING APPARATUS FOR EXTRUDING PRESSES
Filed Aug. 11, 1930 11 Sheets-Sheet 11
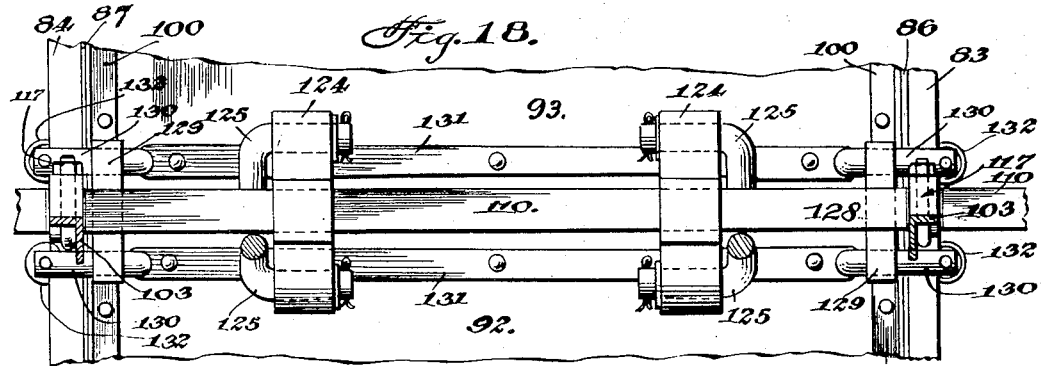
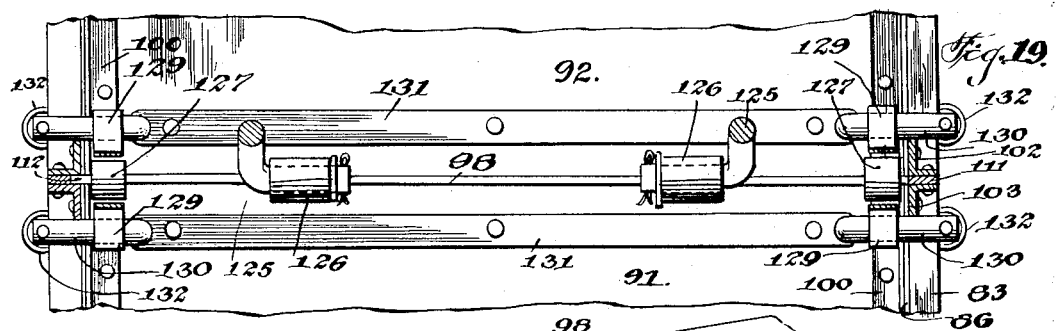
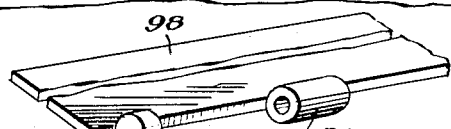
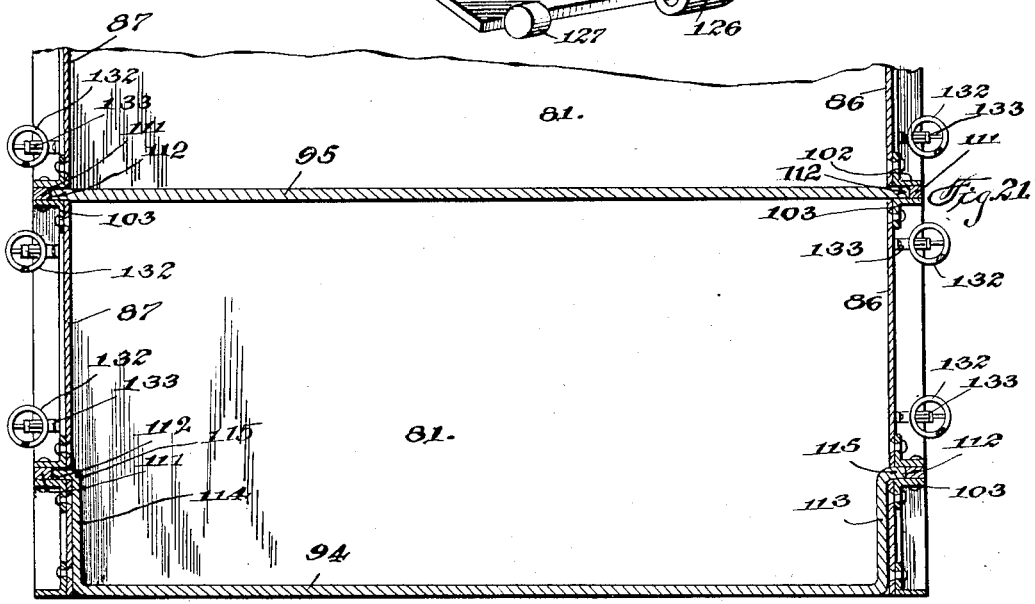

Patented Mar. 13, 1934

1,950,426

UNITED STATES PATENT OFFICE 1,950,426

FEEDING APPARATUS FOR EXTRUDING PRESSES

Wilson A. Wilhelm, Vernon, Tex.

Application August 11, 1930, Serial No. 474,603

50 Claims. (Cl. 100—50)

This invention relates to improvements in feeding apparatus and it consists of the constructions, combinations and arrangements herein described and claimed.

An object of the invention is to provide an apparatus for feeding an extruding press with reasonably determinable volumes of material, the specific purpose of the apparatus used herein as one illustration being to feed an extruding press with quantities of cooked, hot cotton seed meal or meats, toward the furtherance of which end it is a purpose of the invention to heat the meal cans during what is herein known as the receiving position so that the meal will always remain in the most favorable condition for the action of the press.

Another object of the invention is to provide for the periodic movement of the meal carriage between the receiving and discharge positions, use being made of the otherwise lost heat of a certain steam-jacketed conveyor which is designed to temporarily displace surplus meal, as the medium for keeping the meal carriage and the contents of the cans hot while in the receiving position.

Another object of the invention is to provide for a sectional discharge of the contents of the meal cans over the press for the important purpose of insuring the expulsion of air from the compression boxes as well as the compacting of the meal in said boxes.

A further object of the invention is to employ a particular mode of opening the meal cans so that the contents will be certain to drop out, thus to avoid any possibility of the meal which is a gummy, viscous mass, from sticking or bridging in the cans.

Other objects and advantages will appear in the following specification, reference being had to the accompanying drawings in which Figure 1 is a plan view of the feeding apparatus, particularly showing the meal distributor as well as illustrating its relationship to an extruding press.

Figure 2 is a front elevation of the extruding press showing the meal carriage of the feeding apparatus in position for a forward advance in the direction of the observer to assume its ultimate discharge position in reference to the press.

Figure 3 is an end elevation of the structure as seen when viewed from the lower end of Figure 1, the meal carriage being in the receiving position in respect to the feeding apparatus.

Figure 4 is a plan view of the meal distributor of Figure 1, the platform being omitted and the parts being shown on a somewhat larger scale.

Figure 5 is a cross section taken on the line 5—5 of Figure 1.

Figure 6 is a detail sectional view taken substantially on the line 6—6 of Figure 5, particularly illustrating one of the slide valves of the meal distributor.

Figure 7 is a fragmentary view of one of said valves, particularly showing the leading end.

Figure 8 is a vertical section taken on the line 8—8 of Figure 5, particularly showing the plurality of manual levers by which the slide valves (Fig. 6) of the meal distributor are successively opened and closed.

Figure 9 is a vertical section taken on the line 9—9 of Figure 3, particularly showing the details of the meal carriage from the rear.

Figure 10 is a front elevation of the central pair of meal cans (Fig. 9), the channel irons from which the cans are suspended being shown in section.

Figure 11 is a detail plan view of the top latch, the structure appearing as though seen in the plane 11—11 in Figure 10.

Figure 12 is a detail vertical section taken on the line 12—12 of Figure 10.

Figure 13 is a detail vertical section taken on the line 13—13 of Figure 10.

Figure 14 is a cross section taken on the line 14—14 of Figure 10.

Figure 15 is a partial elevational and sectional view of the central pair of cans, the sectional portion appearing as though taken on the line 15—15 of Figure 14.

Figure 16 is a detail vertical section taken on the line 16—16 of Figure 14, particularly showing the rounded bearing portion of one of the gate control shafts, the showing of the parts being that of the closed position of the gates.

Figure 17 is a somewhat similar view but showing the structure at the bottom of the meal cans, the parts being in the open position of the gates.

Figure 18 is a detail vertical section taken on the line 18—18 of Figure 15.

Figure 19 is a detail vertical section taken on the line 19—19 of Figure 15.

Figure 20 is a fragmentary perspective view of one of the meal can gates.

Figure 21 is a detail vertical section taken on the line 21—21 of Figure 10.

Figure 22 is a fragmentary plan view of the bottom plate of the meal distributor.

Figure 23 is a fragmentary perspective view of a portion of the bottom gate.

Figure 1:
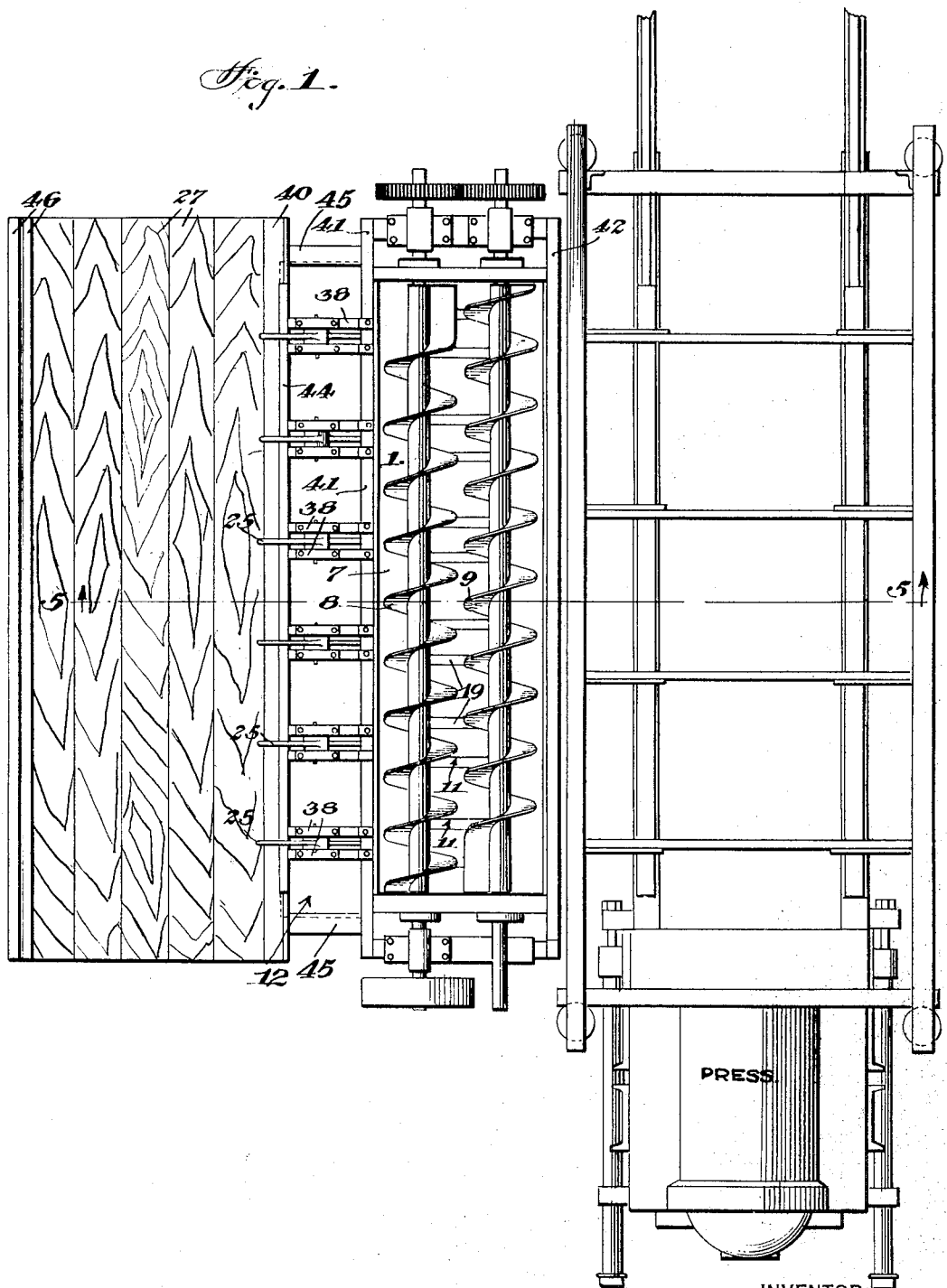

This feeding apparatus is intended to be used in conjunction with a certain press for extruding oil from cotton seed meal or meats disclosed in an application for Letters Patent filed by Wilson A. Wilhelm, August 11, 1930, Serial No. 474,602, otherwise identified as Case No. 1. In the preparation of the cotton seed for the extraction of the oil one of the steps is to cook the previously crushed and otherwise treated meats. The last step results in the production of a hot, gummy mass which is to be introduced into the extruding press for the purpose of extracting the oil. By virtue of this mass being gummy many problems peculiar to the handling of it arise during its conveyance to the press.

The feeding apparatus herein disclosed is especially adapted to the purpose, several of its outstanding features being the keeping of the meal at a uniform temperature as well as making provision against its sticking or bridging in the cans of the carriage.

Generally described, the structure comprises a meal distributor 1 (Figs. 1, 3, 4 and 5) meal carriage 2 (Fig. 3), press 3 (Figs. 2 and 3), cake stripper 4, cake breaker 5 (Fig. 2) and surplus meal conveyor 6 (Fig. 3). These elements form a part of an oil extracting system which is fully brought out in Case No. 1 and of which the press 3 is an important part. The cake stripper 4 (Figs. 2 and 3) is the subject matter of another application known as Case No. 3, filed by Wilson A. Wilhelm, August 11, 1930 Serial No. 474,604.

It is the purpose of the meal distributor 1 to supply the carriage 2 with hot cooked meal. It is the purpose of the carriage 2 to supply the press 3 with this material. The purpose of the cake stripper 4 is to remove the compressed cakes from the press 3, the purpose of the breaker 5 to reduce the cakes to fragments and of the conveyor 6 to catch any surplus meal dropped from the carriage 2 so that there will be an avoidance of a collection of the meal on the floor.

Describing the elements with which this application is concerned, the distributor 1 comprises a trough 7 which is broad enough to contain a pair of augers 8, 9 (Fig. 5) for the purpose of conveying the meal back and forth over an opening 10. The action of the augers is to continuously mix the material so that it will always remain in condition for discharge at the successive ones of a series of slots 11 (Fig. 4) in a plate 12 (Fig. 5) which is fitted over the opening 10 to provide a bottom.

In lieu of using the augers 8, 9 it would be regarded as within the spirit of this disclosure to use some other type of conveyor running back and forth in the trough 7. It may be found that the augers might channel the meal and confine the discharge points directly beneath them. A type of conveyor, for example a slat and chain arrangement, would continuously agitate the meal and prevent its hilling in the center. However, the augers well illustrate the principle and are herein used for illustration.

Jacketed sides 13 (Fig. 5) are adapted to be circulated with steam for the purpose of keeping the contents of the trough 7 hot. The bottom plate 12 is a composite structure consisting of upper and lower sections 14, 15 (Figs. 8 and 22) and central spacer sections 16. In each instance the spacers are narrower than the upper and lower sections thus, when assembled, to define grooves 17 (Figs. 4 and 22). The sections are spaced by separators 18 which space the slots 11 in which the slide valves 19 operate.

The separators 18 (Fig. 5) comprise a member 20 around which a strip of metal 21 is bent in the form shown in Figure 5, the total thickness of each separator being equal to that of the adjacent sections 14, 15 and 16. It is to be observed that each slide valve 19 is of a composite or laminated structure similar to that of the bottom plate 12. The side edges of the spacer section 22 (Fig. 7) extend beyond the edges of the upper and lower sections 23, 24 to define tongues which ride in and are guided by the grooves 17 (Fig. 22) of the bottom plate 12.

Hand levers 25, 26 (Figs. 5 and 8) have connection with pairs of the valves 19 (Fig. 8) so that the operation of any desired pair of valves can be accomplished by a workman either on the platform 27 or press room floor 28 (Fig. 3). The lever 25 of any given pair of valves 19 has a fork 29 (Figs. 5 and 8) the ends of each of which are pivotally fitted between links 30 (Figs. 4 and 6) at places approximately midway of their pivotal connection at 31 and 32 with the respective valve 19 and a single link 33.

A T-head 34 (Figs. 4 and 8) with which the upper end of the lever 26 is formed is pivotally connected between the rear ends of a pair of the links 33. From this it will be understood that the valves 19 can be manipulated equally as well from the platform 27 as though the operator were standing on the floor. The mode of operation of the valves will be to begin at one end of the distributor 1 (for example the lower end of Figure 4) and work toward the remote end. A forward push on either lever 25 or 26 will serve to open the connected pair of valves 19 while the reverse pull will again close the valves.

It is to be observed that the laminated construction of the bottom plate 12 and valves 19 produces perfectly smooth surfaces both inside of the trough 7 and on the nether side of the bottom plate. The action of the augers 8, 9 is to cause a striking off of the material against the edges of the slots 11 when the valves 19 are open, thus to insure a discharge of the meal from the trough 7. The laminated nature of the bottom plate 12 and valves 19, while a matter of mechanical expediency, is also a matter of choice because of the comparative ease and cheapness with which the manufacture can be carried out.

In making the spacer section 22 of each valve 19 the leading edge is provided with semi-circular cuts 35 (Fig. 6). These extend at the sides of a bevel formation 36 which matches a confronting formation 37 on the separator 18 (Fig. 22). The purpose of the bevels 36, 37 is to provide knife edges which will cause a sharp cutting off of the meal. The purpose of the semi-circular cuts 35 is to produce plows which clear the grooves 17 (Fig. 22) in advance of the valve 19 during the closing movement. Any meal accumulated in the grooves will be plowed out so that there will be no subsequent obstruction to the free movement of the valve.

Brackets 38, consisting of pairs of strap irons bent to form (Figs. 1 and 5) pivotally support the levers 25. A similar arrangement of brackets 39 (Fig. 5) supports the levers 36. The ends of the brackets 38 are secured to an angle iron 40 and to one of a pair of channels 41, 42 (Figs. 1 and 5) which comprise part of the main support of the meal distributor 1. These channels rest on standards 43 (Fig. 3), there being one of these on each of the four corners of the meal distributor. The platform 27 is supplemented by a board 44 or its equivalent, which is secured to the brackets 38 not only to stabilize them but to provide the operator with an abutment against which he can brace himself in the operation of the valves 19, especially in the closing movement.

A plurality of I-beams 45 (Figs. 5 and 8) supports the platform 27. The rear ends of these are connected to opposed channels 46 (Fig. 5) beneath which they are swung. The front ends are secured to the channels 41 by angle irons 47. The outermost ones of the I-beams 45 (Fig. 8) support rails 48 in inverted positions. These rails are for the guidance and the reception of the upward thrust of a pair of double-flanged wheels 49 (Figs. 3, 4 and 5) of a truck mounted on the upper side of cantilever arms 50 of the meal carriage 2 (Fig. 3).

These wheels are carried by a shaft 51 journaled in bearings 52 secured on top of the arms 50 A similar arrangement prevails below the cantilever arms where similar bearings 53 (Fig. 5) support the shaft 54 of a pair of double-flanged wheels 55. These wheels run on rails 56 which are mounted on I-beams 57 in turn supported by angle brackets 58 (Figs. 5 and 8) secured to the insides of the standards 43. Fillers 59 reinforce the I-beams 57, preventing them from turning inwardly by virtue of the weight imposed thereon.

An I-beam 60, traversing the rear of the rails 56 (Figs. 5 and 8) rests on extensions of the beams 57 and provides a support for the brackets 39 of the levers 26, spacers 61 and beams 62, the confronting ends of which are secured at 63 (Fig. 8) to channels 64 which flank a hydraulic cylinder 65 which contains a piston (not shown) for the movement of the meal carriage 2 forwardly and backwardly between the delivering and receiving positions.

The channels 64 rest on a filler 66 which in turn is secured to the beam 60. Although other structure depends on the beam 60 for support the prinicipal purpose of the former is to carry the hydraulic cylinder 65 which is suitably secured to the channels 64 as at 64ª. The beams 62 provide a support for the extended end of the bottom 12, or in other words for the rear ends of the valve guides into which the slotted construction converts the bottom plate.

Angle irons 67 (Figs. 4 and 5) suspended from the channels 46 provide places for the attachment at 68 of the rear end of the flanking channels 64. The suspension 67 is braced against lateral motion by bars 69 which are secured in the crossed relationship suggested in Figure 4. The channels 46 as well as the supports of the platform are carried by a pair of standards 70 which complete a set of six, the other two being the standards 43 (Fig. 3) previously mentioned.

Thus far it will be understood that the standards 43, 70 are part of a stationary framework on which the meal distributor 1 has its fixed support and in reference to which the meal carriage 2 is movable between receiving and discharging positions respectively under the distributor 1 and over the press 3 (Fig. 3). It is further understood that the slide valves 19 (Fig. 6) are capable of opening and closing movements in successive pairs (Fig. 4) by the manual operation of the gangs of levers 25 or 26 (Fig. 5) accessible either from the platform 27 or from the press room floor 28 (Fig. 3).

The action of the piston (not shown) of the hydraulic cylinder 65 (Fig. 5) is subject to manual control through an appropriate valve (not shown) which has pipe connections 71, 72 with the opposite ends of the cylinder. When pressure fluid is introduced in the back of the cylinder the piston rod 73 is forced out, and a supporting frame, generally denoted 74 (Fig. 5) goes with it. It is to this frame that the cantilever arms 50 are attached. It will be remembered that these arms carry the trucks which ride on the rails 48, 56 (Fig. 5). Therefore, upon admitting pressure fluid to the left end of the cylinder 65, the frame 74 and all of its carried parts, is projected to a position over the press 3 (dotted lines, Fig. 3).

The following is a description of the meal carriage 2 and its details. Figure 9 illustrates the meal carriage as viewed from the rear on a position at the left of Fig. 3. That portion of Figure 2 concerned with the mail carriage illustrates the latter as viewed from the front or a position at the right of Figure 3.

Secured transversely of the frame 74 to the comparatively heavy channels which constitute the front and rear (Fig. 5), is a series of smaller channels 75 (Fig. 9) that are arranged in confronting pairs (Fig. 15) for the support of a plurality of cans.

These cans are comparatively long and narrow but will be of adequate volume to transport more than enough meal for the supply of the press 3. With the exception of the end cans 76, 77 (Fig. 9) all are arranged in pairs (Figs. 14 and 15). They are distinguished as the central pair 78 (Fig. 9) and intermediate pairs 79, 80. The purpose of the distinction arises from minor differences in structural details which will be explained, although in all instances the principles of the construction and operation are identical.

Each can, regardless of whether it is one of the end, central or intermediate cans, comprises an outer plate 81 (Figs. 10 and 15). This plate is secured at the top at 82 (Figs. 10 and 15) to one of a pair of channels 75 in common with one component of each of a pair of front and rear angle iron frames 83, 84, (Fig. 14) the other component of which is secured at 85 to the companion channel 75 of the foregoing pair. The frames 83, 84 are formed in generally rectangular shapes and are secured to front and rear plates 86, 87 (Fig. 14) which thus partially complete a meal compartment.

There is a vertical series of such compartments in each of the cans (Fig. 15), these compartments being completed by movable inner sides 88, 89, 90, 91, 92 and 93 as well as movable gates 94, 95, 96, 97, 98 and 99. The movement of the sides, say for example 92 (Fig. 14) occurs between the plates 86, 87 and is facilitated by attached bearing angles 100 which provide sliding joints which are tight enough to prevent the escape of meal, yet loose enough to enable freedom of movement.

Each of the sides 88 to 92 (Fig. 15) is capable of a double pivotal movement so that it assumes a canted position (see side 89) before it assumes the ultimate straight position (see side 88). This canting of the sides 88 to 92 is begun at the bottom of each can and progresses toward the top. The purpose of thus canting the sides is to release the impounded meal and provide for a quick drop of the blocks or sections of stock contained by the successive compartments.

The upper side 93 (Fig. 15) requires only a single pivotal movement, its edge bearing angles 100 being mounted by pivoted rivets 101 which pass through the respective plates 86, 87 and the adjacent inner components of the frames 83, 84. Now it can be understood that the top opening of each can must register with a discharge slot 11 of the meal distributor 1 (Fig. 4) when the carrier 2 is in the receiving position (Fig. 3). But instead of any pair 78 or 79 of the cans (Fig. 9) registering with a pair of the discharge slots 11 (Fig. 4), the pairs of slots are made to register with adjacent cans of the various pairs 78, 79 and end cans 76, 77.

To make this plain refer to Figures 4 and 9. The left end can 76 and the adjacent can of the pair 79 will register with the first pair of slots 11 at the left (Fig. 4). The next pair of slots 11 is registrable with the adjacent cans of the intermediate pairs 79 while the third pair of slots 11 will be registrable with adjacent cans of the central and intermediate pairs 78, 79 and so on. This arrangement is one of both mechanical expediency and necessity. There is certain actuating mechanism of the sides 88, etc., and the gates 94 etc. (Fig. 15) which must be disposed between the cans in the instance of the pairs 78, 79 and to the outsides of the cans 76, 77. In the instance of the press 3 there are certain top end gates which are projectible into such positions that they will assume places between the pairs of cans when the meal carriage 2 is advanced over the press (Fig. 2).

Reverting to the top openings of the meal cans, the slots 11 (Fig. 4) register approximately with only so much of the space as appears between the top edges of the side 93 (Fig. 15) and the outer plate 81. There is, therefore, no possibility of any of the meal dropping behind the movable side 93. Prior to filling a can (using only one for example) the bottom gate 94 (Fig. 15) must be closed but the remaining gates 95 to 99 must be open so that the can will present a continuous opening from top to bottom. After the can has been filled the gates 95 to 99 (Fig. 15) are projected or closed, thus to divide the can into the vertical series of compartments previously mentioned. It is a matter of preference whether or not to close the gates 95 etc. in succession from the bottom, but in opening the gates when the meal carriage 2 has been transported to the discharging position (Fig. 3) it is imperative that the gates be opened progressively from the bottom to discharge the stock in sections.

There is a purpose in this that can be understood here but which will be more apparent in a consideration of Case No. 1. If the stock were discharged in a mass into each of the compression boxes of the press 3 (Fig. 2), there would be the danger of entrapping air that would create air pockets in the stock to the detriment of the subsequent expressing operation. But by dropping the stock in sections, or piece-meal so to speak, there will be ample opportunity for the air to escape, and when the compression boxes of the press are fully loaded there will be no air pockets. The result is that each compression box will contain a more uniformly or solidly formed cake.

The front and rear frames 83, 84 (Figs. 10 and 14) of each compartment of each of the cans of the pairs 78, 79, 80 (Fig. 9) have extensions 102, 103 which reach inwardly in all instances excepting the instance of the end cans 76, 77 (Fig. 9). These extensions are a part of the front and rear frames 83, 84, the angle iron being cut and bent into shape to stiffen the majority of the profile edges of the front and rear plates 86, 87 (Figs. 10 and 14) when secured as they are.

In the instance of the upper front and rear frames 83, 84 (Figs. 10 and 15) the angle iron is cut and bent around in the rectangular loop formation. In the instance of the next succeeding five frames the angle iron is bent to omit the return end of the loop, fillers 104 being inserted and secured beside the confronting edges of the front and rear plates 86, 87. In other words, the frames 83, 84 in the instance of the uppermost ones comprise substantial rectangles completed from single pieces of angle iron, while in the instance of the other five frames inserts or fillers 104 are used because of the necessity of having the extensions 103 reach out toward the central gate control shafts 105, 106, 107, 108, 109 and 110.

Extensions 102, 103 of vertically adjacent frames 83, 84 are separated by the spacers 111 (Figs. 10 and 12) to provide passages 112 for the reception and guidance of the gates 94 to 99 (Fig. 21). In all instances excepting that of the bottom gate 94, perfectly plane plates are used. Therefore, in the majority of instances the front and rear edges of the gates are received and guided by the passages 112.

But in the instance of the bottom gate 94 (Fig. 21) a somewhat modified construction is resorted to in order to dispose the bottom gate below any of the parts that operate it. This provision is necessary because it is the function of the bottom gate 94 to cut off the meal flush with the top of the compression boxes of the press 3. Therefore, the bottom gate 94 must be lowest of any of the meal can elements because if it were otherwise then some of the actuating mechanism would strike parts of the press.

For these purposes the front and rear ends 113, 114 (Figs. 15 and 21) are turned up and flanged at 115 to ride in the passages 112 just as in the instance of the other gates. While on the subject of the bottom gate 94 it is to be noted that the lowermost front and rear frames (see 84, Fig. 10) are made shorter than the others and bent transversely. Its extensions 103, as in the instance of all other similar extensions, are dished at 116 (Fig. 16) to form a part of a bearing which is completed by a cap 117 and U-bolt 118 with nuts to hold the cap in place.

It is in the bearings thus provided that the control shafts 105 to 110 (Figs. 10) have support. These shafts are square (Figs. 10 and 14) but are rounded at 119 (Figs. 16 and 17) at the places where they rest in the bearings. The control shafts extend from front to rear of the meal carriage and in the instance of the pair of cans 78, 79 are situated in the middle. Every shaft of all of the cans has a crank arm 120. The crank arms are shown at the rear (Figs. 3 and 9) although in practice they might be at the front.

Bars 121 (Fig. 9) connect the crank arms 120 in horizontal series so that an operation of any one of the bars 121 will simultaneously rock all of the control shafts in that series and simultaneously either open or close the corresponding gates. For example, a movement of the lowermost bar 121 to the right (Fig. 9) would cause the simultaneous opening of all of the bottom gates 94. The same is true of the bar 121 and gates 95 next highest. The position then assumed by these gates is shown in Figure 15. The progressive operation of the remaining bars 121 would similarly open the gates 96, 97 etc.

Some of the crank arms 122 (Fig. 9) are bent. This is merely to avoid adjacent structure. Others 123 are made shorter for the same purpose, but in all cases the operation is the same. In the instance of the uppermost series the crank arms 120 and bars 121 are located at the front of the meal carriage 2 (Figs. 3 and 9) in order to avoid the ends of the cantilever arms 50 when thrusting the arms from one side to the other.

It is to be observed that the crank arms extend at angles in the upward direction from the gate control shafts 105 to 110 by which they are carried. The purpose of this arrangement is to make use of gravity in maintaining the arms in either adjustment. When the gates 94, etc. are either open or closed the weight of the crank arms and of the connected bars 121 will tend to keep them so.

The rocking action of the control shafts 105, etc. is transmitted to the gates 94 etc. whereupon it is applied as sliding action. For this purpose each control shaft has pairs of rockers 124 affixed thereto (Figs. 14 and 15). The ends of these rockers are connected by means of links 125 with knuckles 126 on the exposed confronting edges of the gates. Thus it will be understood that the foregoing movement of the lowermost bar 121 to the right (Fig. 9) will rock all of the gate control shafts 105 as well as its carried rockers 124 to the right (Fig. 15) and open or retract the lowermost gates 94 by means of the links 125. Reverse actions occur when the bar 121 is moved to the left.

The rocking motion of the control shafts 105 to 110, in addition to opening the gates on the opening movements of the bars 121, is instrumental in causing a delayed canting of the movable sides 88 to 93 (Fig. 15) by the following means:—Each gate 94, etc. has a lug 127 near each extremity (Figs. 19 and 20) in line with the bight 128 of a loop 129 which is secured at its ends to the projecting pins 130 of a stiffening rib 131 (Figs. 14 to 19) secured across the movable sides 88, etc. near the top and bottom. In other words, the stiffening ribs 131 are secured near the horizontal edges of adjacent sides 88, 89, etc. (Fig. 15). Since the gates are slidable in position between these adjacent edges it follows that when the gates are opened the lugs 127 will ultimately reach the bights 128 of the loops 129 and pull on the sides.

This pull is calculated to occur near the end of the opening movement of a gate. In actual practice it would occur during approximately the last ½" of opening movement of a gate. The purpose of this provision is to insure a nearly full opening of the gate prior to canting the adjacent side of the compartment to be emptied. The opening of the gate and of the adjacent side is canted as illustrated in the instance of the gate 95 and side 89 (Fig. 15).

As seen in Figures 14 and 19 the lugs 127 and loops 129 are arranged in pairs, one of each appearing near the extremities of the gates. The purpose of this arrangement is to insure uniformity in the canting movement of the compartment sides 88 etc. Thus far it can be understood that upon an opening movement of one of the control shafts the first part of the action is confined to retracting each of the connected gates. At the same time that the inner edge of each gate comes flush with the inner surface of the movable side of the compartment thereabove the lugs 127 will meet the bights 128 of the loops 129 so that the canting of the sides occurs simultaneously with the continued opening movement of the gate. Thus it will be seen that the major opening movement of a gate is succeeded by a delayed canting of an adjacent compartment side, the canting action enduring for the remaining opening movement of the gate.

Take, for example, the gates 94 and 95 and the co-acting sides 88, 89 of the compartments which they serve (Fig. 15). The gates 94 are shown open and the sides 88 erected in substantial parallelism with the outer plates 81. At first the sides 88 were canted, that is before the gates 95 were opened. But upon opening the gates 95 the ultimate pull of the loops 129 on the lugs 127 of the gates 95 simultaneously straightened the formerly canted sides 88 and canted the formerly straight sides 89 of the compartment next highest.

This action obtains in the instance of each filled compartment. The movable sides are canted progressively from the bottom as the various gates are retracted to dump the contents of the compartments. This makes a flaring outlet of the compartments so that there will be no possibility of the stock sticking. Each compartment retains its flared shape until the gate next highest is opened, whereupon its movable side becomes substantially parallel with the outer plate 81.

When all of the compartments have been opened, the movable sides 88, 89 etc. will again be substantially parallel with the outer plates 81 just as they were originally prior to filling of the cans, although now the movable sides are spaced a little farther from the plates 81 than they were originally. This is readily understood from Figure 15.

The term "substantially" parallel is used in connection with the movable sides because in actual practice there is a difference of approximately ½" between the width of the bottom and top compartments, the bottom compartments being widest and the taper occurring in the upward direction. This taper or inclination, as it might be called, is uniform from bottom to top, and although scarcely perceptible as far as appearances go, yet has the tendency of compacting the stock when originally dumped into the cans by the meal distributor 1.

The movable sides 88, etc. are held under tension by sets of springs 132 (Figs. 10, 14) which are connected at the outer ends to fixed clips 133 (Figs. 14, 16) and at the inner ends to eye bolts 134 screwed crosswise into the approximate extremities of the pins 130. The springs draw and hold the pins 130 against the inner front and rear angle components of the frames 83 and 84 which thus act as abutments limiting the inward movement of the movable sides in respect to their compartments.

It is also to be observed that the pins 130 ride on the extensions 102, 103 (Figs. 14 and 16). In addition to thus providing bearing supports for the movable sides 88, etc. the latter are prevented from riding either up or down in respect to their compartments, or in other words, are kept in perfectly true positions.

Another function of the pins 130 is that of a pivotal mounting of the movable sides which mounting is progressively shifted from bottom to top of a meal can as the discharging function is made to occur. This can be understood by referring to the sides 89 (Fig. 15). Upon canting the sides 89 by action of the control shaft 106 the upper pins 130 will remain held against the vertical angle iron components of the frames 83, 84 (Fig. 10) by the connected springs. The pivotal movement, although slight, occurs where the pins rest in the corners between these components of the extensions 103 (Figs. 10 and 16).

Upon opening each horizontal series of compartments the respective movable sides and gates become latched in the retracted or inner positions (Fig. 15) by a latch mechanism which is combined with the central pair of cans 78 (Fig. 9) but acts for all of the cans. The construction is as follows:—One end of each of the control shafts 105 to 110 carries a latch disc 135 which has a single tooth 136 with a cam approach 137. A U-bar 138 (Figs. 10 and 14), appropriately secured to the adjacent can structure, provides the pivotal support at 139 for latch bolts 140 which are threaded to adjustably carry latch heads 141. The latch heads have extension sleeves 141ᵃ which provide an adjacent bearing surface. Jam nuts 142 lock the adjustments of the latch heads.

In lieu of the latch bolt and head structure 140, 141 at the top of the compartment series there is a latch plate 143 (Figs. 10 and 11), pivotally supported at 144 between a pair of parallel bars 145 (Figs. 11, 12 and 13), which bars function as the release of all of the latches for the purposes of enabling the springs 132 to simultaneously return all of the sides 88 to 93 (Fig. 15) to the original contracted position and enabling the manual closure of all of the bottom gates 94 by a shifting of the lower bar 121 (Fig. 9) to the right. The contracting or closing movement of the sides 88 to 93 (Fig. 15) is ½" in extent, this being the same ½" over which the lower and upper ends were successively moved outwardly or expanded during the stock dumping operation. The gates 95 and 99 also follow the sides inwardly to the same extent and the reason for the peculiar action of the gates and sides upon a raising of the release bars 145 (Fig. 10) is as follows:—

It will be remembered that it was the successive turns to the right of the control shafts 105, 106 (Figs. 10 and 15) that shifted the rockers 124 and opened the gates 94, 95 as well as retracted the sides 88, 89 (Fig. 15). The springs 132 of the two lowermost compartments thus concerned did not come into play until the beginning of approximately the last ½" of movement of the gates 94, 95. Simultaneously with the arrival of the inner edges of the gates 94, 95 with the inner surfaces of the sides 88, 89 (the term inner having reference to the compartments themselves) the loops 129 are picked up at the bights 128 by the lugs 127 on the gates (Fig. 17). The rest of the approximately ½" opening movement of the gates was then accomplished by the adjacent parts of the sides 88, 89 with a maintenance of the flush relationship mentioned.

It is only during the last half of movement that the springs 132 (Fig. 17) are put under tension. The amount of movement is indicated in Figure 17 where the pins 130 are shown resting against the edge of the bearing iron 100. The amount of displacement is measured between the left edge of the iron 100 and the left edge of the frame component 84. This displacement might be measured in terms of spring expansion. It is one of the functions of the springs 132 to return the pins 130 to the abutting engagement with the frames 83, 84, but for more than this the inherent tension of the springs 132 is of no effect.

Now it can be understood that a raising of the bars 145 (Fig. 10) will render the springs 132 free to pull the pins 130 back into engagement with the frames 83, 84 (Fig. 16). Since the loops 129 have their engagement with the gate lugs 127 at the bights 128 (Fig. 17) it is obvious that each of the gates will move toward the closing position simultaneously with the sides to the extent of a half inch.

However, this does not close the cans. It remains for the operator to shift the lower bar 121 to the left (Fig. 9) to close all of the bottom gates 94. He must do this while the meal carriage 2 remains over the press 3, thus clipping off the meal flush with the tops of the compression boxes. There will be some meal remaining in the cans of the meal carriage 2, but this will be transported back to the receiving position beneath the distributor 1 (Fig. 3) to form part of the next batch. After the cans are then filled the operator will move each of the bars 121 (Fig. 9) to the left, closing the successive gates 95 etc. (Fig. 15) to again reinstate the vertical series of compartments.

This closing of the gates marks a departure of the inner edges from the former flush relationship with the inner surfaces of the adjacent movable sides (having reference to the compartments) for example, in closing the gates 95 (Fig. 15) the closing movement would mark a departure of the inner edges, next to the compartments from the inner surfaces of the sides 89 until those inner edges abut the outer plates 81. Reverting to the fractional contraction of the springs 132 (Fig. 17) wherein a ½" of movement of the movable sides was taken up, it will be obvious that the corresponding movement of the gates (for example 94) will induce a slight movement toward the left (Fig. 17) of the control shaft 105. There will be only a slight raising and leftward shifting of the connected lower bar 121 (Fig. 9). This same degree of shifting disposes the tooth 136 (Fig. 10) to the left and out of range of the latch head 141.

All of the latch heads 141 will then rest on the high points of the teeth 136 or on top of the cam approaches 137 when the bars 145 are released by the operator. This leaves the various control shafts 106 to 110 (Figs. 10 and 15) free for turning when the successive bars 121 (Fig. 9), beginning at the second bar from the bottom, are shifted leftward for the closing of the gates 95, etc. in the foregoing receiving position.

Simultaneous lifting of all of the latches 141, 143 (Fig. 10) upon raising the bars 145 is made to occur by spools 146 on which the sleeves 141ᵃ rest in the instance of the latch heads 141, and by shoulders 147 (Fig. 11) on the latch plate 143 which are engageable with the edges of the bars 145 to keep the latch plate in a substantially right angular relationship. The raising movement is imparted to the bars 145 by a handle 148 (Figs. 10 and 13) and thrust spool 149 which rests on top of the bottom sleeve 141ᵃ.

The handle 148 would be made and applied according to any one of a variety of ways, but for illustration the free extremity of the bottom latch bolt 148 is shown bent out at right angles for the purpose. After the sleeve 141ᵃ is screwed in place on the bolt 140 the free end is bent out at right angles to form the handle 148. The raising movement of the release bars is transmitted to all of the latch sleeves by the nether spools 146 on which they rest, the raising thrust being delivered by the spool 149 on top of the lower sleeve 141ᵃ.

Reverting to the latch plate 143 (Fig. 11), it will be understood that this can swing down no farther than permitted by the engagement of the shoulders 147 with the edges of the bars 145. The pivot 144 is slightly off center. However, the latch plate 143 is free to swing upwardly, as it must do to make way for the tooth 136 of the upper disc 135 (Fig. 10) when the upper control shaft 110 is turned to the right for the opening of the gates 99.

In addition to supporting the sleeves 141a and serving as thrust members for the latches 141 the various spools 146, 149 (Fig. 10) also act as spacers for the release bars 145. Although latches 141 are best retained by the double bars 145 it is conceivable that only a single release bar might serve the purpose because the sleeves 141a would keep their positions on the spools by virtue of the latter being of concave shapes. Therefore, for the purpose of the claims the actuating means of the latches 141 may be regarded as a single release bar with the attached spools.

With the foregoing description of the meal cans in mind the slight structural distinctions between the end cans 76, 77, central pair 78 and intermediate pairs 79, 80 (Fig. 9) can be better appreciated. The end cans 76, 77 are only singles, the actuating mechanism extending off to the left or right in the respective instances. All other cans are arranged in pairs. But it is with the central pair 78 that the latch mechanism (Fig. 10) is combined. This acts for all of the cans by virtue of the common connection which the horizontal series of rods 131 affords.

The cake stripper 4 and cake breaker 5 (Fig. 2) would be the next in the order of description were it not for the fact that the former is the subject matter of an independent application, and the latter may be of any one of a variety of types. The purpose of the cake stripper 4 is to remove the cakes from the press 3 after the extraction of the oil. The purpose of the breaker 5 is to break the cake for other purposes.

Reference is now made to the surplus meal conveyor 6 (Figs. 3 and 9). This includes a conventional auger 150 but its novel feature which is of particular pertinence to the invention because of its location is the steam jacketed trough 151 in which the auger works.

In practice the meal carriage 2 occupies the receiving position (Fig. 3) approximately 90% of the operating time. It is thus highly important that the cans of the meal carriage shall be kept hot. This is accomplished by making an enclosure for the meal carriage in the receiving position, and by virtue of the conveyor 6 being at the bottom of it, it follows that the heat from the steam jacketed trough will envelope the meal carriage 2 and keep it hot.

This enclosure includes sides 152 and a back 153 (Fig. 3). These are attached to standards 43, and a sloping plate 154 (Fig. 3), extending from the trough 151 to a point of proximity with the carriage 2, abuts the sides 152 at the ends to make as nearly complete an enclosure as possible.

At this point it may be stated that the fixed relationship of the sides 152 and back 153 is not necessarily adhered to. In practice these sides and the back may be made a part of and movable with the carriage 2. However, there is an advantage of having the enclosure fixed because then this can become filled with heated air during the absence of the meal carriage in readiness to more favorably receive the latter upon its return to the receiving position.

The foregoing enclosure, whether stationary as shown or movable with the carriage 2 as optionally described, is augmented by an apron 155 (Fig. 3) which is movable with the meal carriage 2. In addition to partially closing the open front when the meal carriage is in the receiving position, it also functions as a chute to deliver to the conveyor 6 any material that may have dropped from the carriage on its way to the discharge position over the press 3.

For these purposes the apron is pivoted at 156 to the front edge of the trough 151. Cables 157, there being one at each end (Fig. 9), have connections 158, 159 respectively with the framework and the apron 155 (Fig. 3). Sheaves 160, are so mounted at any appropriate place on the meal carriage 2 that when the carriage returns to its receiving position the sheaves will catch the cables 157 (Fig. 3) and exercise an upward pull of the apron so that the latter closes in with the meal carriage.

It is in this action that any fragments caught thereby are dumped back into the conveyor 6. The apron also assists the deflector 154 (Fig. 3) in directing the hot air upwardly. Upon a movement of the meal carriage to the discharge position a reverse action occurs. A relaxation of the cables 157 enables the apron to gravitate to the dotted line position in Figure 3.

The purpose of the surplus meal conveyor 6 (Fig. 3) is not solely to receive the fragments of meal discharged from the apron 155 when erected. Mention has been made of a quantity of meal being retained in the cans of the meal carriage 2 upon a closure of the bottom gates 94 (Fig. 15). It may be found that local conditions may undesirably chill this residual meal making it desirable, if not imperative, to temporarily discard this residual meal and fill the cans with entirely fresh batches.

It is under a circumstance such as this that the surplus meal conveyor 6 becomes of importance. The operator has only to open the bottom gates 94 upon returning the meal carriage 2 to the receiving position (Fig. 3) to dump the contents, whereupon the cans can be freshly filled from the distributor 1 upon a subsequent closure of the bottom gates 94.

In practice the surplus meal will be conveyed over a complete circuit of which the spout 161 (Fig. 9) is a part. This spout will discharge into a suitable elevator which will carry the surplus meal up to the distributor 1 where it is mixed with the other stock and ultimately fed to the meal carriage 2.

It is well to note the relationship of the meal distributor 1 to the conveyor 6 (Fig. 3). One is directly over the other, or substantially so. Although the trough 7 of the meal distributor 1 is steam jacketed at 13 (Fig. 5), the effect of the heated air arising from the conveyor 6 is beneficial nevertheless. The heat from the lower conveyor will circulate around the upper distributor and thus augment the heating function of the steam jacket 13.

The operation is readily understood. The meal carriage 2 (Fig. 3) is movable between receiving and discharge positions. The movement is subject to manual control and is accomplished by admitting pressure fluid into one end or the other of the hydraulic cylinder 65 (Fig. 5). This contains a piston (not shown), the rod 73 of which is joined with the supporting frame 74 of the carriage.

The movement of the meal carriage is periodic although the duration of the intervals of movement are not timed with exactness, by virtue of being subject to manual supervision, yet in practice the meal carriage 2 will occupy the receiving position (full lines Fig. 3) approximately 90% of the operating time.

The receiving position is between the distributor 1 and the conveyor 6. The discharge position is over the press 3. The purpose of the feeding apparatus is to supply the press 3 with full volumes of stock in what might be said in one discharging operation, although the discharge of the stock is divided into sections as is already understood but which is presently further described.

Assume the meal carriage 2 to be in the receiving position (full lines Fig. 3). The bottom gates 94 (Fig. 15) are closed. The remaining gates 95 to 99 are open. All of the cranks 120 with the exception of the lower series of cranks 120, will be inclined toward the right when looking at the rear of the carriage 2. The lower series would be inclined toward the left by virtue of the bottom gates 94 being closed. In Figure 9 all gates are closed, hence all cranks are inclined to the left.

The meal carriage 2 now constitutes nothing more than a plurality of suspended cans open at the top and closed at the bottom. The open tops are in registration with the discharge slots 11 of the meal distributor trough 7. The slots are no wider than the can openings, in fact preferably narrower, so that when the slide valves 19 (Figs. 5 and 6) are withdrawn the meal will drop directly into the cans and none will be spilled at the sides.

The opening of the slides 19 is preferably begun at one end of the distributor 1 and ended at the other. Should the operator be on the platform 27 (Fig. 5) he can push the successive levers 25 (Fig. 1), or should he be on the press room floor 28 (Fig. 3) he can push levers 26. In either case the action would be to withdraw or open the slide valves 19 in successive pairs, these valves being coupled by the particular end constructions of the levers well illustrated in Figure 8.

As the slide valves 19 are opened the meal will drop to the bottom of the cans, and the operator will leave the valves open until the cans are filled. Since the cooked meal is supplied to the distributor 1 in respectively uniform batches the operator will be able to tell when the cans are full by the fact that the trough 7 has been emptied or nearly so. But regardless of the quantity of the material in the trough 7 being an indication as to whether or not the cans are filled, it would be practically impossible to discharge more from the trough than the cans could hold because the mouths of the cans come so close to the nether sides of the bottom plate 12 as to almost constitute a seal between the two. Therefore, any over charge of stock in the trough 7 would simply be circulated back and forth in the trough past the mouths of the cans with no deleterious effect as far as spilling is concerned.

Having thus filled the cans the next acts of the operator will be to close the slide valves 19 (Fig. 5) and then close the gates 95, 96, etc. (Fig. 15) progressively from the bottom. This is done by shifting the rods 121 to the left (Fig. 9). As already stated, Figure 9 shows all of the rods as having been shifted to the left, hence all of the gates 95 etc. are closed.

Each succeeding closure of a set of gates completes a horizontal series of compartments filled with meal. The reason for thus dividing or cutting the meal into sections is to enable a sectional discharge thereof into the press 3. The action might be described as cutting a plastic mass of material into so many blocks and then discharging the blocks in a pre-arranged order, which in this instance happens to be a horizontal series.

It has been brought out before that there is a slight difference in the lateral dimensions of the cans between the bottom and top. The cans are a little wider at the bottom than at the top, and although the difference is almost imperceptible yet does have the effect of compacting or settling the meal in the cans. This is also an aid to the discharge of the foregoing sections, although the more decided canting of the movable sides 88, etc. (Fig. 15) is relied on for the release of the meal blocks or sections and a quick dropping thereof into the compression boxes of the press.

Assume next that the meal carriage 2 is in the discharge position over the press 3 (dotted lines, Fig. 3). Where the cans 76—80 (Fig. 9) previously registered at the top with the discharge slots 11 of the distributor 1 they now register at the bottom with the mouths of the compression boxes of the press 3. The operator will now shift each of the rods 121 (Fig. 9) to the right, beginning at the bottom and working up, so that the rockers 124 of each set of cans, whether they be 76 or pairs 78 to 80 (Fig. 9), will assume inclinations indentical with those of the two lowermost rockers 124 in Fig. 15.

A horizontal series of meal blocks drops with each rightward shifting of a rod 121 and the consequent opening of its connected sets of gates. It has been brought out before that the sectional dropping of the meal serves to evacuate the compression boxes of the press 3 of air. There is another effect which it would be well to understand at this point. The meal cans are approximately 56" high while the compression boxes of the press are approximately 38" high.

The difference in height between the cans and boxes is compensated for by a lateral enlargement of the compression boxes so that the latter will be filled regardless of further reduction in height. But in filling the boxes the successively higher blocks of meal will fall successively farther into the compression boxes so that gravitation is enlisted as an aid in packing the boxes.

This is best understood by considering the first or lower series of meal blocks as falling approximatel 38" to the bottom of the compression boxes while the top series of meal blocks will fall approximately 56". The result is that the following layers of meal in the compression boxes are pounded down harder each time.

Revert to the rightward shifting of the lower rod 121 (Fig. 9) and consider the attendant action as illustrative of all others. The links 125 (Fig. 15) will open the connected gates 94. The opening movement is limited by the engagement of the links 125 with the corners of the respective control shaft 105. Simultaneously with the meeting of the inner edges of the gates 94 with the inner surfaces of the sides 88 (these relative terms having reference to the meal compartments) the lugs 127 on the bottom gates will reach the bights 128 of the loops 129 in which they previously travel freely.

The continued movement of the gates 94 to the fully open position (a matter of approximately ½") is accomplished by the lower parts of the movable sides 88 (Fig. 15), the gate edges and inside surfaces maintaining the flush relationship mentioned.

Since the upper parts of the sides 88 are unaffected by the turning of the lower rockers 124 it follows that the springs 132 (Fig. 10) will hold the upper pins 130 in the corners between the frames 83, 84 and extensions 103, constituting a pivotal mounting in reference to which the sides 88 will assume a canting position.

Each set of sides 88, 89 etc. (Fig. 15) is canted in a similar way, and the flaring outlet thus presented is what releases the meal blocks and enables the desired quick drop.

Where the rightward turning of the bottom rockers 124 (Fig. 5) merely cants the bottom sides 88, the turning of the successively higher rockers causes the canting of the sides next highest and also the straightening of the previously canted but adjacent lower sides. For example, the turning of the rockers 124, second from the bottom Figure 15, not only straightens the sides 88 but cants the next highest sides 89 simultaneously with the last half inch of opening movement of the gates 95. The same action occurs up to the top control shaft 110. The last and upper sides 93 are not straightened as are their predecessors, but retain their temporarily canted positions until the latch rod 145 (Fig. 10) is lifted to allow the springs 132 to simultaneously restore all of the sides 88 to 93 as well as the gates 95 to 99 to the positions that they assumed prior to the travel of the last half inch.

After the last gates 99 (Fig. 15) have been opened the next act of the operator will be to shift the bottom rod 121 (Fig. 9) to the left thus closing the bottom gates 94 and "clipping" or cutting off the column of meal which projects out of the compression boxes into the lower open ends of the cans. The amount of meal thus cut off may vary somewhat in height, but the cubical contents of the cans and the compression boxes will be so regulated that there will always be a surplus of meal thus to insure the complete filling of the compression boxes.

The top part of the meal thus cut off is carried back by the meal carriage 2 to the receiving position where it either remains to form part of the next batch or is dumped into the meal conveyor 6 if the temperature has fallen or for other reasons. The next acts of the operator are but a repetition of what has been stated before, it being remembered that a filling of the cans is accompanied by a closure of the gates 95, etc. to re-define a series of compartments and to separate the meal into blocks or sections.

While the construction and arrangement of the improved feeding apparatus is that of a generaly preferred form, obviously modifications and changes may be made without departing from the spirit of the invention or the scope of the claims.

I claim:

1. Feeding apparatus comprising a material distributor, a sulplus material conveyor spaced below but in line with said distributor and having associated heating means, a carriage for transporting the contents of the distributor to a discharge position, and means for periodically moving the carriage to a receiving position beneath the distributor, thus occupying the heated region above the conveyor to keep its contents hot while remaining in the receiving position.

2. Feeding apparatus comprising a sulplus material conveyor having provision for the heating of its contents, a vertically spaced distributor constituting the source of the material, means defining a partial enclosure extending from the conveyor to the distributor confining the heat arising from the conveyor, and a carriage periodically movable into the heated enclosure to assume a receiving position beneath the distributor.

3. Feeding apparatus comprising a framework, a material distributor mounted in an enclosed position on the framework and having provision for the heating of the contents of the distributor, a surplus material conveyor spaced below the distributor and having provision for the heating of its contents, and enclosure means extending between the conveyor and distributor directing heat arising from the former to the latter and augmenting the function of the heating provision of the distributor.

4. Feeding apparatus comprising a carriage movable between receiving and discharging positions in respect to a material distributor and press, a heated partial enclosure associated with the distributor into and out of which the carriage is movable toward and from the receiving position, and means which is a part of the enclosure, being movably mounted to follow the carriage in its movement into and out of the partial enclosure.

5. Feeding apparatus comprising a carriage movable between receiving and discharging positions between a material distributor and press, a heated partial enclosure for the carriage being associated with the distributor, a movably mounted apron which is part of the enclosure, and means actuated by the carriage causing the apron to follow the carriage on its initial departure and final entry movement with respect to the enclosure.

6. Feeding apparatus comprising a carriage, a framework upon which the carriage is movable between two positions, an enclosure for the carriage situated at one of the positions and having a movable apron, a flexible element connecting the apron with the framework, and means on the carriage engaging the element upon movement of the carriage into the enclosure, causing the apron to follow the carriage and shut the carriage in.

7. Feeding apparatus comprising a material carriage movable between receiving and discharging positions, a surplus material conveyor situated at the receiving position, and an apron connected with the conveyor to move with the carriage toward the discharging position and back to the receiving position respectively to catch any material dropping from the carriage and to dump it back into the conveyor.

8. Feeding apparatus comprising a distributor trough having a slotted bottom, a valve for opening and closing the slot, means operating in the trough to agitate material contained thereby and work it through the slot, and a carriage movable to a receiving position beneath the trough, including a can having a mouth registrable with the slot and disposed close to the bottom to establish a substantial seal to avoid an overflow of the material if the closure of the valve should be overlooked.

9. Feeding apparatus comprising a distributor trough having a slotted bottom, a carriage movable to a receiving position beneath the trough including a can having a mouth registrable with the slot, and a valve slidably combined with the slot and being flush with the nether surface of the bottom to enable a close fit of the carriage and a substantial seal between the bottom and the can mouth.

10. Feeding apparatus comprising a distributor trough having a slotted bottom, a can having a mouth registrable with the slot for filling from the contents of the trough, and a supporting frame comprising part of a movable carriage working close to the bottom of the trough with the top of which frame the can mouth is flush to form a substantial seal with the trough bottom.

11. Feeding apparatus comprising a distributor trough, a carriage movable to a receiving position beneath the trough, including a can having a mouth by which material from the trough is received, a bottom plate for the trough having a slot with which the can mouth is registrable and being composed of laminations arranged to form grooves along the same, and a valve to control the slot also composed of laminations arranged to form ribs to slide in the grooves upon opening and closing of the valve.

12. Feeding apparatus comprising a carriage movable to a receiving position, a material trough in said position to supply the carriage, a bottom on the trough having a grooved slot through which the material is discharged, and a valve to control the discharge of material, having ribs slidable in the grooves formed with plow ends to clear out any material obstructing the grooves.

13. Feeding apparatus comprising a carriage movable toward a receiving position, a material trough for supplying the carriage, a bottom on the trough having a grooved slot through which the material is discharged into the carriage, and a laminated valve controlling the flow of material, being composed of upper and lower sections with an extended spacer defining ribs riding in the grooves, an extremity of the spacer being formed into plows to clear the groves of obstructions on the closing movement of the valve.

14. Feeding apparatus comprising a carriage having a can, a trough beneath which the carriage is movable, having an opening through which material is discharged into the can, and a bottom plate for the trough having a slot in communication with the opening and with which the can mouth is registrable, being smaller than the can mouth to limit the discharge to the slot and avoid spilling the material outside of the can.

15. Feeding apparatus comprising a can movable to a receiving position, a material trough to supply the can, a bottom for the trough having a slot with which the can mouth is registrable and ending in a bevel over one end of the can, and a valve to control the flow of material being slidable in the slot and having a confronting but opposite bevel to strike the first bevel and sharply cut off the material.

16. In feeding apparatus, a trough having an opening for the discharge of material, a ribbed valve to control the flow, and a bottom plate for the trough having a slot to which the flow is restricted, being composed of laminated sections spaced to define the sides of the slot and overlapped to provide grooves in which the ribbed valve is slidable, and having a separator in the space abutable by the valve and forming one end of the slot.

17. Feeding apparatus comprising a framework, a carriage movable on the framework to a receiving position, a distributor trough in said position having a valve to control the flow of material into the carriage, and means for opening and closing the valve from either of two positions in respect to the framework.

18. Feeding apparatus comprising a single carriage, a plurality of separate cans integrally combined with the carriage, a single material trough common to all of said cans and having discharge openings with which the mouths of the cans are registrable, and agitating means common to all of the discharge openings operating lengthwise of the trough to work the material through the openings into the cans.

19. In feeding apparatus, a can including a side and a gate, and delayed coupling means associated with the side and gate to retract the gate and shift the side in a common direction, said means comprising an engageable element carried by the side, and a pin carried by the gate to engage said element after preliminary movement of the gate.

20. In feeding apparatus, a can comprising a plurality of sides and a gate, means for partially opening the gate, and means by which one of the sides is then shifted with the gate to the end of its opening movement.

21. In feeding apparatus, a can comprising a plurality of sides and a gate, means for partially opening the gate until the inner edge comes flush with the inner surface of one of the sides, and means for then moving the gate and said side in unison to a fully open position of the gate.

22. In feeding apparatus, a can comprising a plurality of sides, means at opposite approximate extremities of one of the sides for movably mounting said side, and means acting on one of the mounting means to pivotally move the side on the other mounting means and thus cant said side.

23. In feeding apparatus, a can comprising a plurality of sides, means at opposite approximate extremities of one of the sides providing movable mountings, and means to successively act on said mountings first to cant the side and then restore it to a straight or expanded position in respect to the remaining sides.

24. In feeding apparatus, a can comprising a plurality of sides and a gate, a slidable support for the gate, means at opposite approximate extremities of one of the sides providing movable mountings for said side, means for sliding the gate on its support to a partially open position, and means then acting on one of the mountings in unison with the gate, pivotally shifting the side on the other mounting until the fully open position of the gate is reached.

25. In feeding apparatus, a can comprising a plurality of sides, means approximately at one set of parallel extremities of one of the sides providing loose mountings, a movable gate, means for moving the gate until partially open, and means then connecting the moving means with an adjacent mounting thus displacing it and the side in unison with the gate, converting the other mounting into a pivot respecting which the side is canted.

26. In feeding apparatus, a can comprising fixed and movable sides, movable gates extensible into the can between the movable sides to form compartments, and a plurality of means each at the juncture of a gate with adjacent parts of adjoining movable sides, being operable to open the gates and extend the movable sides with a progressive canting and straightening movement of said sides consonant with the opening of the gates.

27. In feeding apparatus, a can having a series of movable sides, movable gates extensible into the can between said sides to form compartments, and means for progressively opening the gates and extending the movable sides to expand the successive compartments.

28. In feeding apparatus, a can having movable sides, gates coacting with said sides to divide the can into compartments, and means for opening and closing the gates and consonantly extending and returning the sides respectively to expand and contract the volume of the can.

29. In feeding apparatus, a can comprising fixed sides and a series of movable sides, and means to progressively shift corresponding portions of each of the sides and with the exception of the extreme sides to simultaneously shift adjacent portions of a side next succeeding to produce a successive change in volume of the can from one end to the other.

30. In feeding apparatus, a can comprising fixed sides and a series of movable sides, means to progressively shift corresponding portions of each of the sides and with the exception of the extreme sides to simultaneously shift adjacent portions of a side next succeeding to produce a successive change in volume of the can from one end to the other, and gates situated between said sides and operable by the progressive shifting means in the directions of movement of said side portions to either form or void compartments from end to end of the can.

31. In feeding apparatus, a can including a pair of movable sides, pins on adjacent portions of said sides, a gate movable between the sides, and means by which the gate is guided and against which said pins are movably rested.

32. In feeding apparatus, a can comprising fixed and movable sides, a plurality of resilient means attached to as many points on the movable side to provide a yielding mounting, and means limiting the action of the resilient means in one direction thus fixing the initial volume of the can.

33. In feeding apparatus, a can comprising fixed sides and a rectangular movable side, springs attached at the approximate four corners of the movable side, and means limiting the action of the springs in one direction thus to fix the initial volume of the can.

34. In feeding apparatus, a can comprising fixed and movable sides, a movable gate, and frames having extensions on which the gate is guided and components extending in one direction of the movable side, pins on said side, resilient means connected with parts of the frames and said pins to normally hold the pins in the corners between said extensions and components, means for sliding the gate to a partially open position, and means then causing the adjacent part of the side to move in unison with the gate, the respective pins riding on the extensions against spring tension, the opposite ends being held in the corners for pivotal movement.

35. In feeding apparatus, a can including a movable side, pairs of pins at opposite approximate extremities of said side, resilient means connected with each of the pins, abutment means against which the pins are thus held to maintain an initial dimension of the can, and means acting on one portion of the side displacing one set of pins against the tension of the connected resilient means, the other set being held against the abutment for pivotal movement by the undisturbed remaining resilient means.

36. In feeding apparatus, a can having a gate between compartments, sides of said compartments between which the gate is situated, means for moving the gate toward an open position, and means across the path of the gate being connected with the sides to move them in consonance with the gate to the fully open position.

37. In feeding apparatus, a can having a gate between compartments, sides of the compartments between which the gate is situated, connecting means for the sides being attached to the sides adjacent to the gate, and means for moving the gate to an open position during which said connecting means is engaged to consonantly move the sides with the gate to the fully open position.

38. In feeding apparatus, a can having a gate between compartments, sides of the compartments between which the gate is situated, a loop attached at its ends to the sides adjacent to the gate, means for moving the gate to an open position, and a lug on the gate engageable in the bight of the loop to displace the sides consonantly with the gate until the fully open position is reached.

39. In feeding apparatus, a can including separate sides, pins on the sides, a loop attached to the pins thus connecting the sides, a gate situated between the sides, means guiding the gate and providing a rest for the pins, and means on the gate to engage the bight of the loop, sliding the pins on their rests and moving the sides consonantly with the gate to the fully open position.

40. In feeding apparatus, a can including plates on three sides, a fourth and movable side, and means carried by parallel edges of the movable side slidably contacting confronting but adjacent sides of the can to provide a bearing.

41. In feeding apparatus, a can having a plurality of fixed sides and a movable side, frames attached to confronting fixed sides including components flush with the free edges of said sides, irons attached to parallel edges of the movable side and bearing against said confronting sides, pins extending from the movable side and against but past the edges of said irons, and springs connected between the pins and frames drawing them against said components to hold the edges of the irons flush with said components and limit the inward movement of the movable side.

42. In feeding apparatus, a can including a gate and side, means to open the gate and shift the side with a movement delayed toward the end of the opening movement of the gate, latch mechanism to then hold the gate and side, release means to displace the latch mechanism preparatory to the closing of the gate and side, and means to return the gate and side a distance equal to the delayed opening movement.

43. In feeding apparatus, a can including a gate and side, a rocker, connections between the rocker, gate and side to open the gate and delay a consonant shifting of the side until the gate is nearly open, and resilient means connected with the side against the tension of which the side is shiftable the distance of the delayed movement, said means returning the side and gate that distance upon a release of the rocker.

44. In feeding apparatus, a row of cans, a series of gates separating each of the cans into compartments, means connecting all of the gates of the series for simultaneous opening and closing, and a single latch mechanism for holding the gates of the series in the open position.

45. In feeding apparatus, a can including a gate, a control shaft, connections between the shaft and gate for moving it to open and closed positions, and a crank by which the shaft is actuated assuming an upright inclination at either adjustment of the gate to utilize gravity for the holding of the gate at either adjustment.

46. In feeding apparatus, a meal carriage comprising a row of cans, a series of gates dividing the cans into compartments, control shafts each having connections with adjacent gates, crank arms on the shafts, and means connecting the crank arms for a simultaneous shifting of the control shafts.

47. In feeding apparatus, a carriage comprising a row of cans, a plurality of series of gates for dividing the cans into compartments, control shafts, connections between the shafts and adjacent gates for opening and closing them, actuating means for operating each series of shafts to consonantly open the gates of that series, and a single latch mechanism common to all of the actuating means for progressively holding the gate series open as the shafts are operated by the successive actuating means.

48. In feeding apparatus, a row of cans, a series of gates and co-acting movable sides constituting parts of compartments into which the cans are divided by the gates, a control shaft for each gate and its movable side, means for turning all of the shafts of a series at once, connections between the control shafts and gates then operated for opening the gates of the series and shifting an adjacent side with a motion delayed toward the end of the opening of the gates, a latch disc on each shaft, and latches co-acting with the discs to hold the gates and sides of the series when fully open.

49. In feeding apparatus, a row of cans, a plurality of series of gates dividing the cans into compartments, actuating means for the gates connecting the series for simultaneous opening of the gates of a series upon operation of the respective actuating means, and a single latch mechanism common to all of the actuating means, being progressively operative to hold the gates of a successive series open.

50. In feeding apparatus, a can having a plurality of sides in substantially vertical alinement, vertically spaced gates located between adjacent ends of the sides to form with the sides a plurality of superimposed compartments, and means to slide each of the gates and to cant the companion side on a progressive order to enable the successive releases of volumes of material contained by the compartments.

WILSON A. WILHELM.